United States Patent [19]

Takai

[11] Patent Number: 4,609,092
[45] Date of Patent: Sep. 2, 1986

[54] CIRCULATIVE CATERING TABLE

[75] Inventor: Hitoshi Takai, Matsuto, Japan

[73] Assignee: Ishino Seisakujo Co., Ltd., Matsuto, Japan

[21] Appl. No.: 584,914

[22] Filed: Feb. 29, 1984

[51] Int. Cl.[4] .............................................. B65G 47/53
[52] U.S. Cl. .................................... 198/367; 198/599; 186/42; 186/49
[58] Field of Search ............................... 186/49, 50–53, 186/42–44; 198/367, 599, 358, 457, 636, 637

[56] References Cited

U.S. PATENT DOCUMENTS

| | | | |
|---|---|---|---|
| 1,831,122 | 11/1931 | King | 198/599 |
| 2,572,325 | 10/1951 | Ernst | 198/636 |
| 2,661,080 | 12/1953 | Xenakis | 186/43 |
| 3,236,360 | 2/1966 | Winter | 198/367 X |
| 3,378,105 | 4/1968 | Kroemer, Jr. | 186/49 |
| 3,550,756 | 12/1970 | Kornylak | 198/637 |
| 3,834,315 | 9/1974 | Warner | 198/358 X |
| 3,895,691 | 7/1975 | Shiraishi | 186/44 |
| 4,173,274 | 11/1979 | Kantarian et al. | 198/367 |
| 4,349,086 | 9/1982 | Yamada | 186/49 |

OTHER PUBLICATIONS

Japanese Patent Public Disclosure No. 58-12621, filing date: Jul. 13, 1981; public disclosure date: Jan. 24, 1983.
Jap. Pat. Public Disclosure No. 59-23383, filing date: Aug. 3, 1982; public disclosure date: Feb. 14, 1984.

Primary Examiner—Joseph E. Valenza
Assistant Examiner—Lyle Kim
Attorney, Agent, or Firm—Kenyon & Kenyon

[57] ABSTRACT

A circulative catering table having a counter and an endless path of travel for dishes and meals, provided in the counter, at least a bypass path of travel is provided, dishes containing therein meals, which have been transferred on a going path portion of the endless path of travel, are led to the bypass path of travel by an arm member for guide rotatably provided and having a length larger than the width of the path of travel, and subsequently, led to a returning path portion of the endless path of travel by another arm member for guide on the returning path portion, whereby a suitable circulative path is formed by the endless path of travel and the bypass path of travel.

1 Claim, 7 Drawing Figures

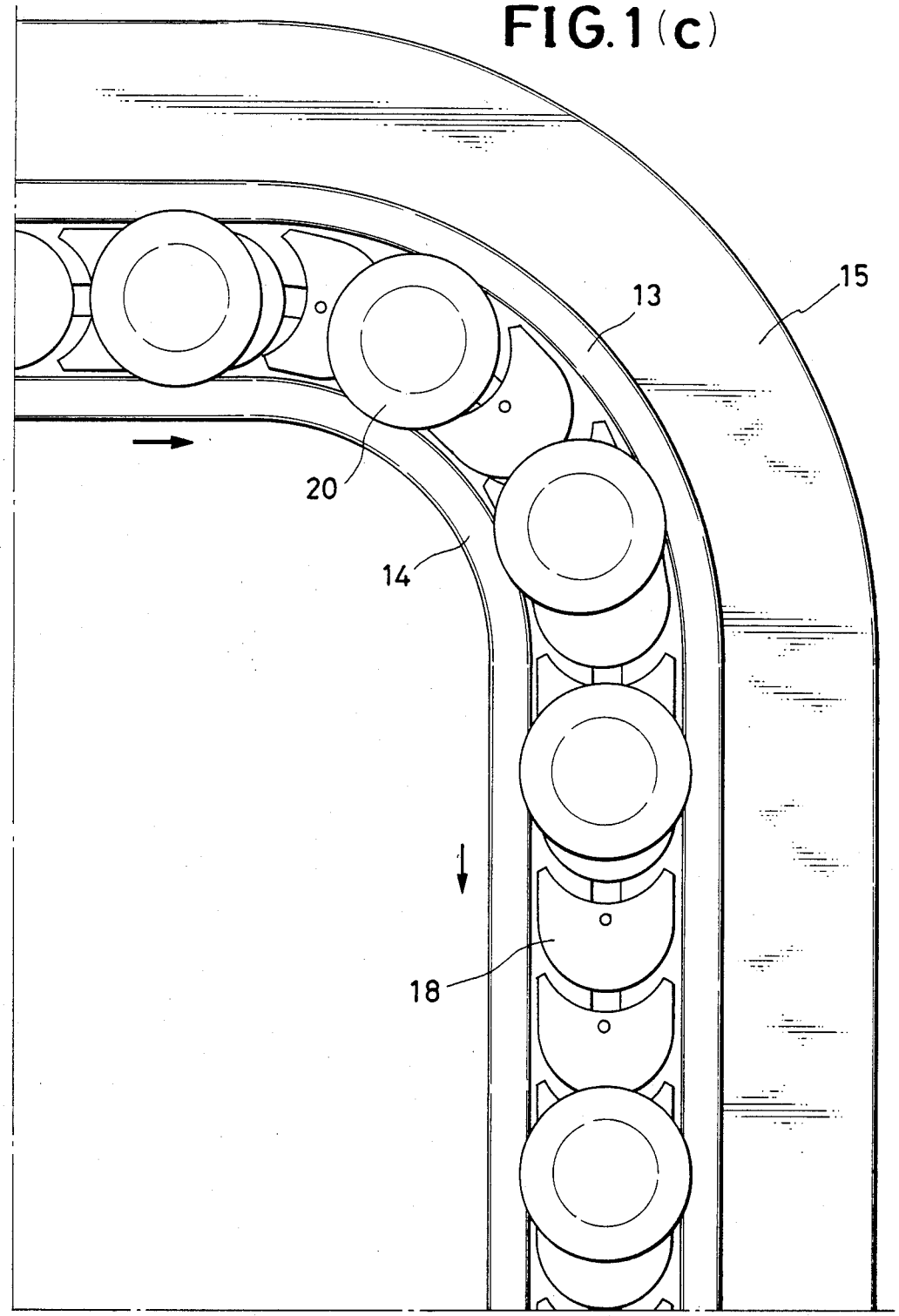

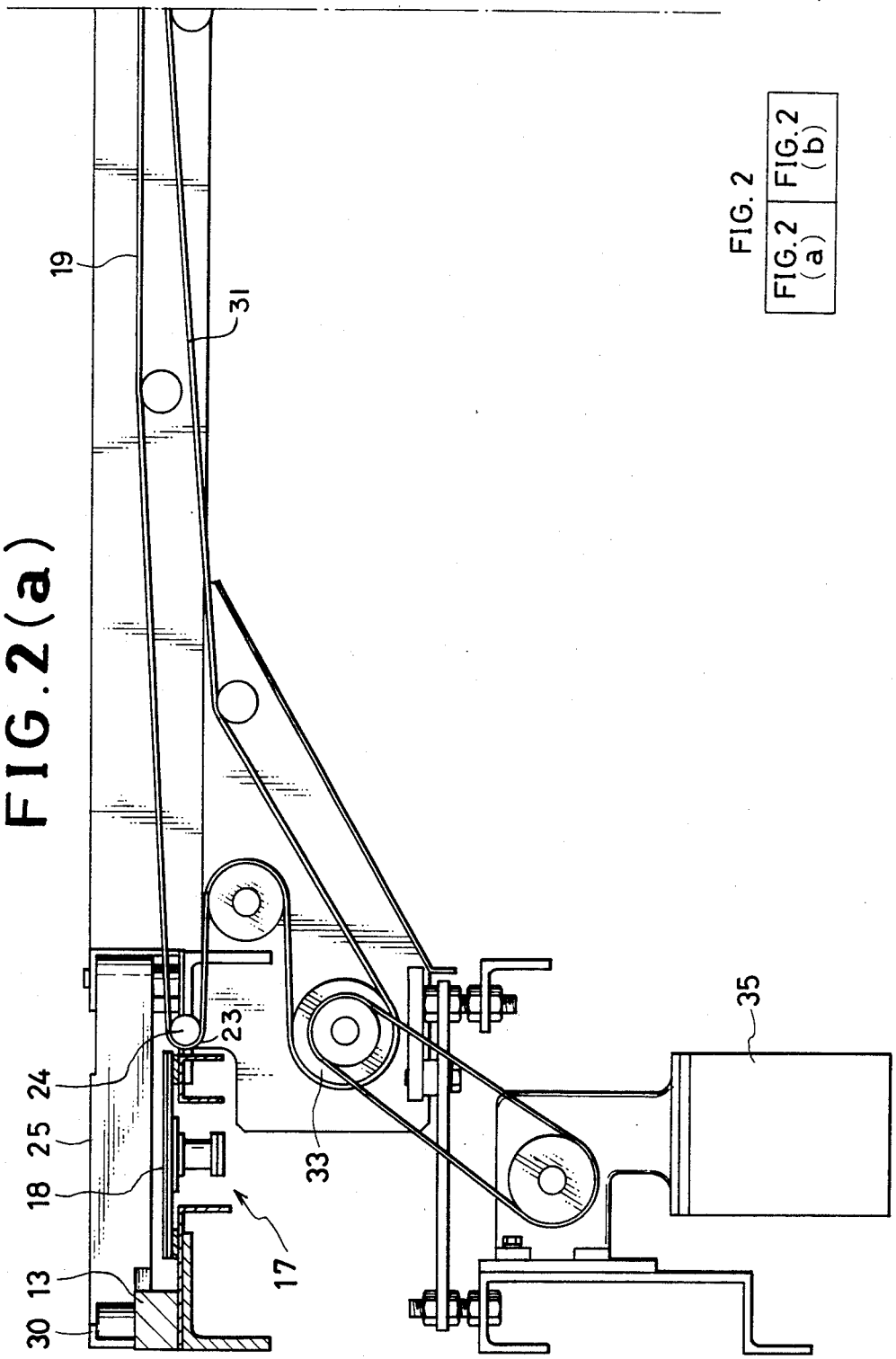

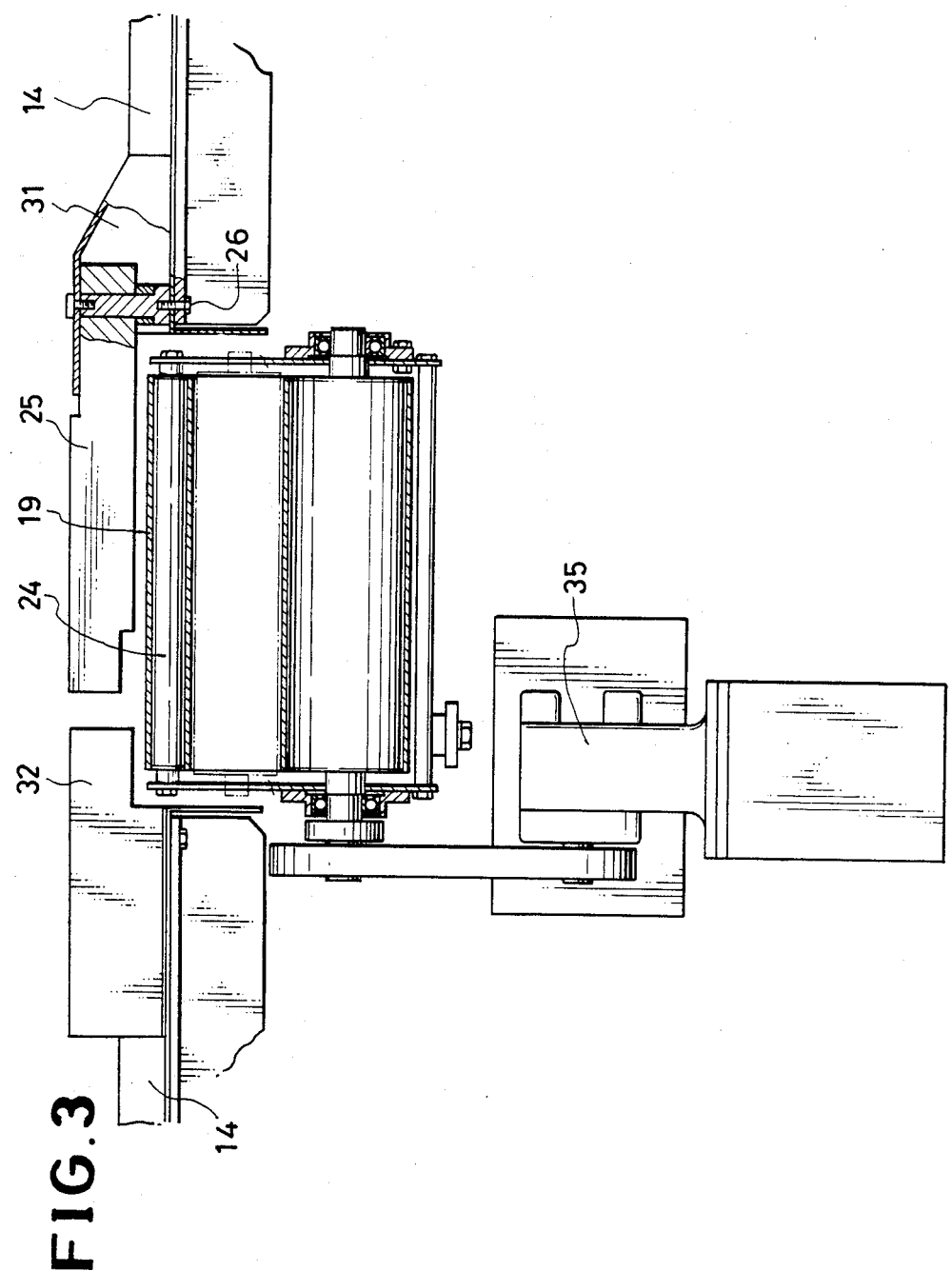

CIRCULATIVE CATERING TABLE

FIELD OF THE INVENTION

This invention relates to a circulative catering table having an endless path of travel for transferring dishes and meals thereon along a catering counter, and more particularly to a circulative catering table having an endless path of travel for transferring dishes and meals thereon along a catering counter, with the endless path having a switchable path or paths of travel for supplying dishes and meals to customers sitting at the catering counter as quickly as possible.

BACKGROUND OF THE INVENTION

Heretofore, there has been widely used a catering counter provided with a conveyor, wherein an endless path of travel is formed along the counter, dishes containing therein meals are rested on the path of travel, both customers sitting at the counter and cooks standing inside the counter need not to move from place to place, and the customers can select and eat meals of preferable taste, from the case of Japanese food "sushi" and the like served to be eaten as they are to the case of food such as grilled meat that the customers themselves can cook and eat.

The catering counter provided with the conveyor of the type described has improved the labor saving in restaurants and been useful for relieving the shortage of labor. However, since the dishes and meals are delivered at predetermined intervals on the path of travel in the catering counter, more dishes and meals than the customers need are delivered when the number of the customers is small, and moreover, the dishes and meals beyond demand are left uneaten for a long period of time, not preferable as viewed from a degree of freshness of the foods and for sanitary reason, and it is wasteful because an excessive power is consumed. However, it has been troublesome and disadvantageous that the number of customers is repeatedly counted at all times and the number of dishes and meals is adjusted to the counter number of customers.

Meanwhile, the present invention has made a proposal of that, in order to save the wasteful labor of delivering dishes containing therein uneaten meals to a kitchen when the number of the customers is small, a rotary disc is provided at a position close to the path of travel for the dishes and meals in front of the kitchen to short-cut the path of travel for the dishes and meals.

Notwithstanding, this proposal has proved unsatisfactory for transferring the dishes containing therein means without any trouble from one of portions of the path of travel for the dishes and meals to the other of portions of the path of travel, because the turning action of the rotary disc affects the transfer of the dishes to a considerable extent.

SUMMARY OF THE INVENTION

The present invention has been developed to obviate the above-described disadvantages of the prior art regarding the catering counter by providing a conveyor bypass path or paths between portions of the path of travel for the dishes and meals, and has as its object the provision of a catering counter wherein a path of travel for the dishes and meals may be suitably selected in accordance with the number of customers by use of the conveyor bypass path or paths.

The present invention contemplates a circulative catering table having an endless path of travel, comprising: a counter; an endless path of travel for dishes and meals, provided on the counter; at least a conveyor bypass path positioned between portions of the endless path of travel and connected at opposite ends thereof to the path of travel; arm members each rotatably provided on one or the other side of the endless path of travel to which the conveyor bypass path is connected and having a length larger than the width of the path of travel; and a fixing member for fixing the arm members in a manner to be inclined to the advancing direction of the endless path of travel; a pin provided upstream of a position where an end portion of said arm member on an outer frame in a going path portion; and an inner frame member having a high back portion at a peripheral portion of said bypass path of travel.

According the present invention, the counter is divided into two type including a single counter type counter and a counter projected therefrom a table or a plurality of table.

Furthermore, the endless path of travel forms a circulative path for transferring the dishes and meals, and a crescent chain conveyor is generally used to form the circulative path, however, a top chain conveyor may be used to form the same. The cresent chain conveyor has corrosion-resistant cresent plates each covered or not covered with a decorative or a corrosion-resistant sheet.

The aforesaid bypass path is positioned between a going path portion and a returning path portion, and is a path connecting the portions of the circulative path of travel for transferring the dishes and meals, i.e., a path connecting the going path portion and the returning path portion in a short-cut manner, and is generally formed by a belt conveyor. It is preferable that the conveyor belt formed of rubber-coated fabric is provided on the surface thereof with fine irregularities to facilitate the transfer of the dishes.

According to the present invention, each of the arm members disposed at one or the other side of the endless path of travel, to which the conveyor bypass path is connected, has a function of diverting the dishes containing therein meals, which have been transferred on the circulative path, to the conveyor bypass path without any trouble such as the fall-down of the meals. Each of the arm members is formed of a rod-like member or a plate-like member, which is rotatably mounted. Particularly, each of the arm members extends over the total width of each of the portions of the path of travel for the dishes and meals to thereby function to smoothly lead the dishes to be diverted onto the conveyor bypass path.

Each of the arm members is disposed in a manner to be slightly apart from the upper surface of the conveyor of the path of travel for dishes and meals, with the bottom portion thereof being positioned lower than the edges of the dishes rested on the upper surface of the conveyor and the top portion thereof being positioned higher than the edges of the dishes. The thus extended arm members over the total width of the path of travel for the dishes and meals make it possible to reliably secure the diversion of the dishes, which have been transferred by the conveyor and to facilitate the guide of the dishes onto the conveyor of the bypass path.

However, when the dishes containing therein means are transferred, being drawn toward the outside of the path of travel for dishes and meals, the dishes engage with an outer frame of the path of travel for dishes and meals, so that the arm member cannot satisfactorily function. Because of this, the dishes containing therein meals, which have been delivered, abut against the arm member, and there may be some cases the dishes run on the outer frame of the path of travel for dishes and meals and stop thereat. In consequence, in the circulative catering table according to the present invention, it is suitable to provide a pin, e.g., a pin mounted thereto with a rotatable roll on the outer frame disposed upstream of the arm member.

On the other hand, with an inner frame of the path of travel for dishes and meals, it is preferable that the back portion of the inner frame is raised at a position around a junction to the bypass path, so that the dishes containing therein meals can be prevented from running on the outer frame and so forth. In addition, the dishes being drawn toward the inside when delivered readily, partially engage the bypass travel conveyor, so that the dishes can be easily diverted to the bypass path.

BRIEF DESCRIPTION OF THE DRAWINGS

FIG. 3 is a sectional side view taken along the line III—III in FIG. 1(a).

DETAILED DESCRIPTION OF THE PREFERRED EMBODIMENT

Description with hereunder be given of the outline of the circulative catering table according to the present invention with reference to FIG. 1.

Figure 1A:
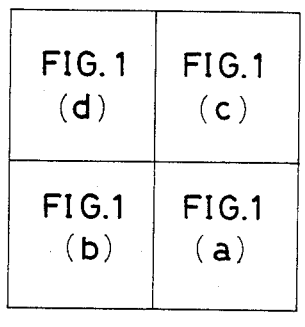
FIGS. 1(a), (b), (c), (d) is a partial plan view showing the circulative catering table according to the present invention.
Figure 1A:
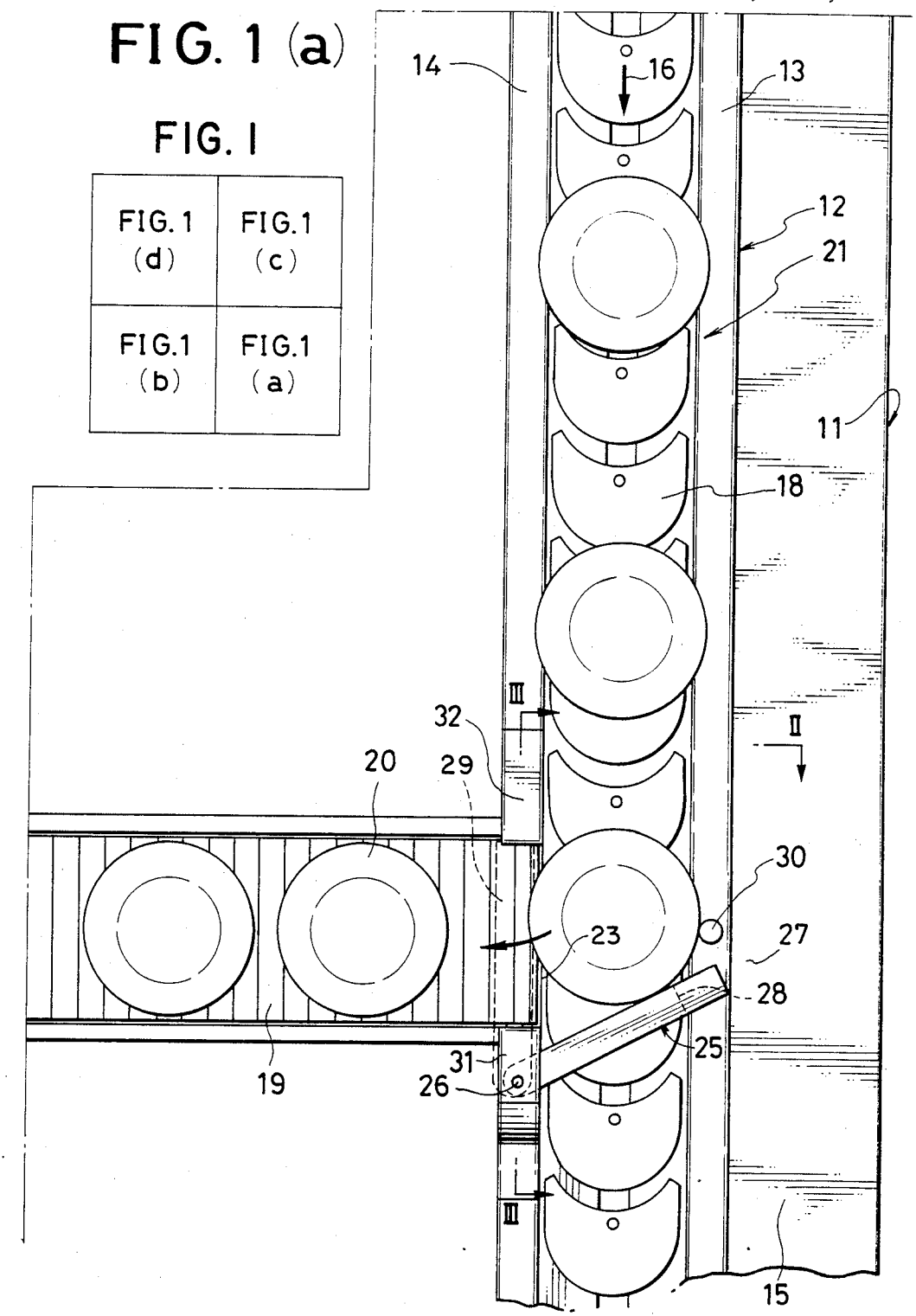
Figure 1B:
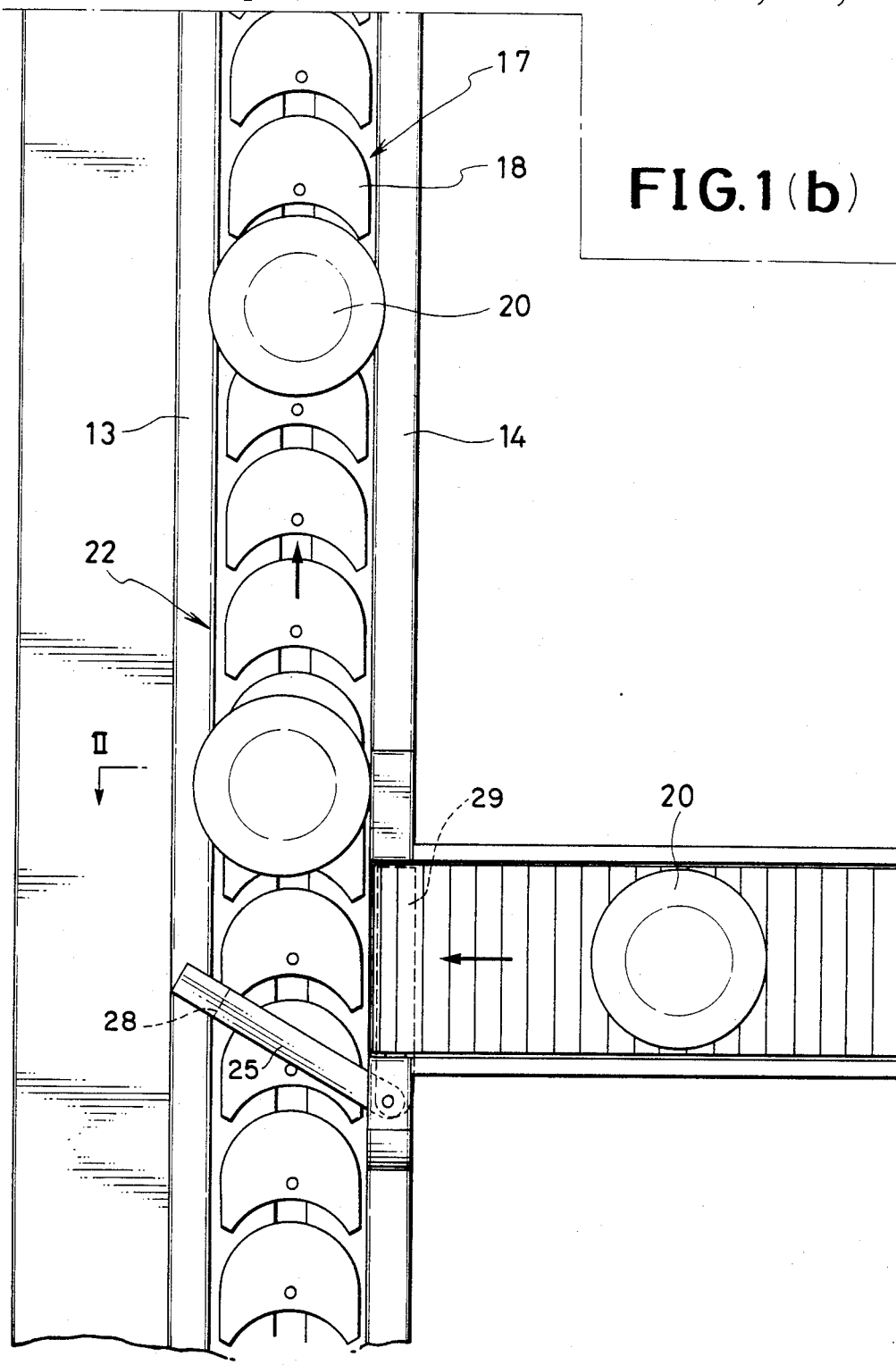
Figure 1D:
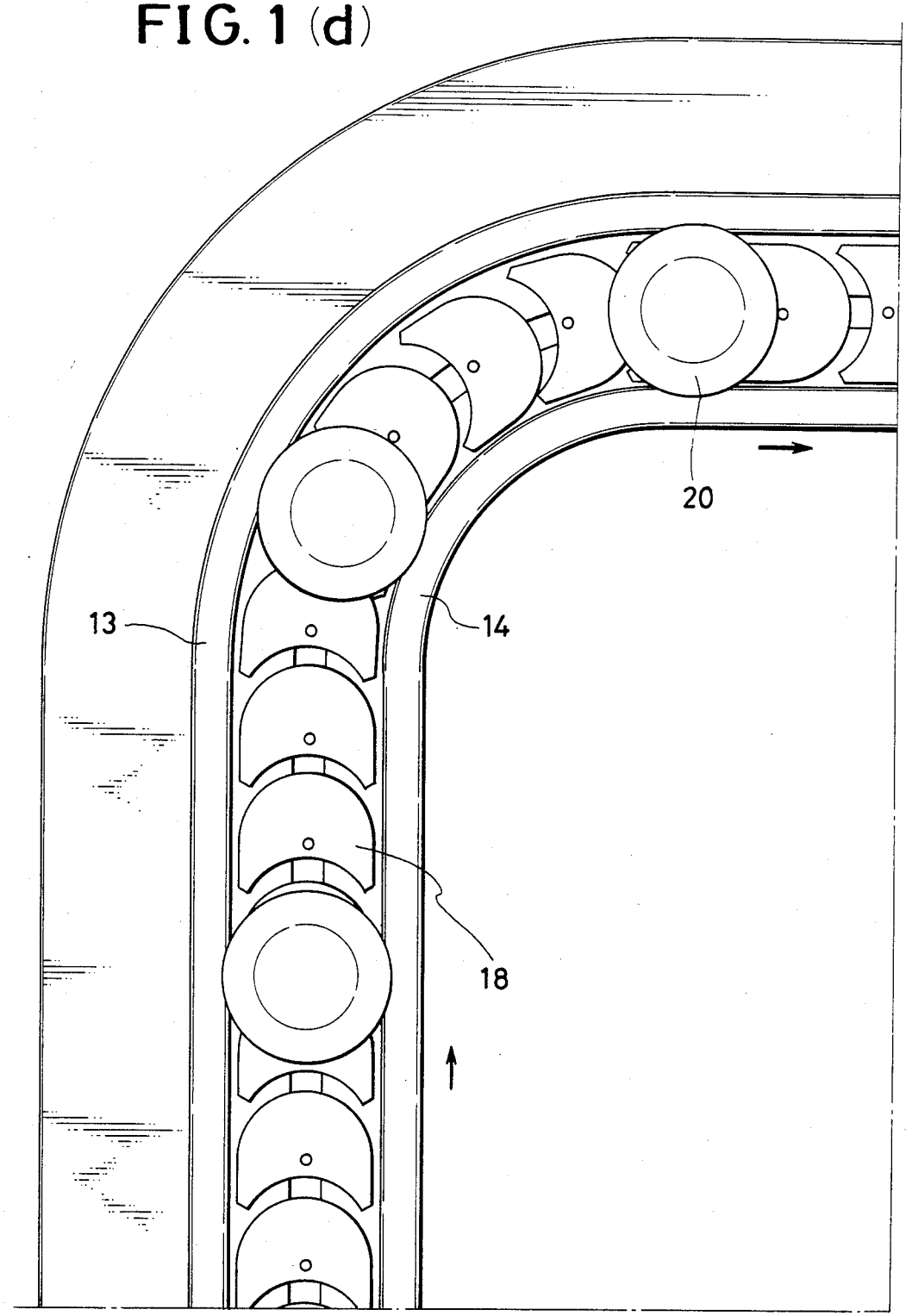
Figure 2B:
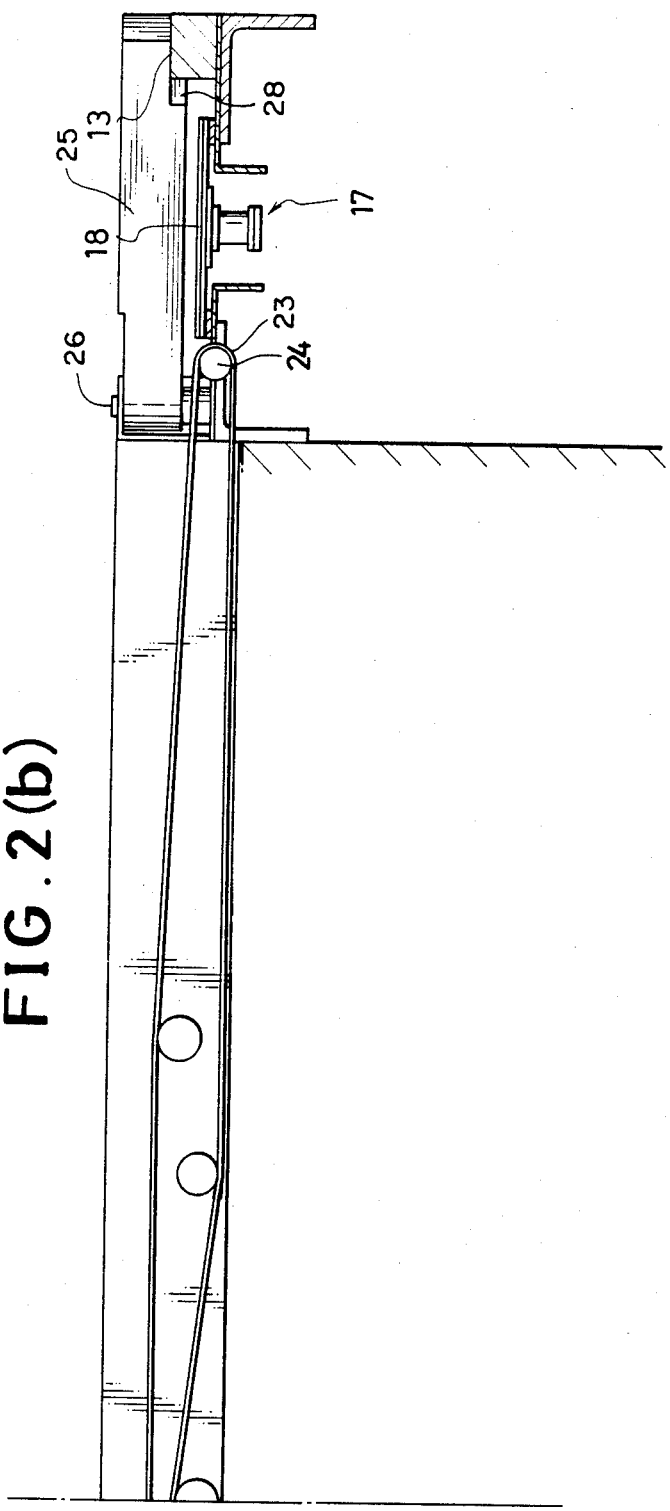
FIGS. 2(a), (b) is a sectional front view taken along the line II—II in FIGS. 1(a), (b)

A catering counter 11 is provided with a conveyor bed 12, and a counter 15 for customers is extendedly provided around an outer frame 13 thereof. An endless path of travel 16 for transferring dishes and meals is formed between the outer frame 13 and an inner frame 14 of the conveyor bed 12. In this embodiment, the path of travel is provided with a crescent type chain conveyor 17 in a manner to circulate endlessly. A dish 19 containing therein meals rested on a crescent-shaped plate 18 of this chain conveyor is transferred at a predetermined rate. A conveyor bypass path 19 is provided between a going path portion 21 and a returning path portion 22 of the path of travel 16 for dishes and meals. As shown in FIG. 2, a conveyor belt 31 of the bypass path 19 is guided around a driving pulley 33 and an idler 24. Each of the ends 23 of the bypass path of travel is provided close to an edge of the crescent conveyor 17, and the surface of the conveyor belt 31 is flush with the surface of the crescent conveyor 18 of the endless path of travel. In consequence, the diversion of the dishes 20 to the conveyor bypass path of travel is facilitated.

A guide arm member 25 is rotatably mounted to a shaft 26 provided on an inner frame 14. The arm member 25 is formed with a cutout 28 in a manner to cross the endless path of travel 16 for dishes and meals and to mount an end portion 27 of the arm member 25 onto the outer frame 13.

When the arm members 25 are disposed on the going path portion 21 and the returning portion 22, crossing the endless path of travel 16, respectively, the dishes 20, firstly in the going path portion 21, abuts its edge portion against the front face of the arm member 25 and moves toward the bypass path of travel 19. In the going path portion 21, a pin 30 having mounted thereon a rotatable roll is provided upstream of the outer frame 13, on which the end portion 27 of the arm member 25 is provided, and the pin 30 prevents the dishes 20 from running on the outer frame 13 when the dishes 20 are diverted to the bypass path of travel. On the other hand, in the returning path portion 22, the dishes 20 abuts its edge portion against the front face of the arm member 25, is mounted onto the crescent conveyor 17 and transferred by the moving crescent conveyor 17.

FIG. 3 shows the inner frame 14 of the conveyor bed 1. This inner frame 14 has a high back portion at the peripheral portion 31 of the bypass path of travel 19. The arm member 25 in the going path portion is provided on a peripheral member 31 of the bypass path of travel downstream of the inner frame, and the arm member 25 in the returning path portion is provided on a peripheral member 32 of the bypass path of travel upstream of the inner frame.

In the circulative catering table with the above-described arrangement according to the present invention, when the number of customers is large at the mealtime for example, the arm members 25 are disposed at a position 29 (indicated by dotted lines), whereby the dishes containing therein meals are circulated throughout the whole course of the endless path of travel. However, when the number of customers is decreased after the mealtime for example, the operation of the crescent conveyor 17 is temporarily stopped, the dishes are put in order, the arm members 25 are taken out, the end portions 27 of the arm members 25 are mounted and fixed to the outer frame, the bypass conveyor belt 19 is started in operation and the crescent conveyor 17 is also started in operation.

The dishes 20 containing therein meals are transferred on the going path portion 21 of the endless path of travel 16, abut against the arm member 25, are guided by the arm member 25, and diverted to the conveyor bypass path of travel 19. The dishes are moved on the conveyor bypass path of travel 19, abut against the arm member 25 of the endless path of travel 16 in the returning path portion 22, and are circulated through the endless path of travel 16.

As has been described hereinabove, in the circulative catering table according to the present invention, the course and the length of course of the path of travel can be adjusted in accordance with the number of customers, the circulative catering table has an outstanding advantage in practical use.

The present invention has been described in conjunction with the specific embodiment shown in the drawings, however, it should be apparent to those skilled in the art that the above-described embodiment is merely representative, which represents the application of the principles of the present invention. Numerous and varied other arrangements and modifications can be devised by those skilled in the art without departing from the spirit and the scope of the invention. Further, protection should be given to all of those duly incorporated within the technical scope of the present invention.

What is claimed is:

1. A circulative catering table apparatus comprising a main endless crescent conveyor means forming an endless path along which dishes and meals are circulated, and inner and outer guide frames disposed along the sides of said endless path for guiding the dishes and meals along said endless path during the circulation thereof, characterized by the combination comprising:

inlet and outlet means formed in opposed portions of said inner guide frame and have a width so that the dishes and meals can pass through said inlet and outlet; bypass conveyor means provided between said inlet and outlet means for circulating the dishes and meals through said bypass conveyor; first and second arm member means provided in said inlet and outlet means, repsectively; said first arm member means being movable between an inoperative position where it closes said inlet and an operative position where it extends over said path to guide dishes and meals from said main conveyor means to said bypasss conveyor means; said second arm member means being movable between an inoperative position where it closes said outlet and an operative position where it extends over said path to guide dishes and meals from said bypass conveyor means to said main conveyor means; and pin member means (30) with a rotatable roll provided at said outer guide frame in the vicinity of said first arm member means, which is put at its operative position, whereby the dishes and meals are prevented from running on the outer guide frame when they abut upon said first arm member means in its operative position.

* * * * *